S. J. OLSSON.
Waste-Cocks or Outlet-Valves.

No. 143,995.  Patented Oct. 28, 1873.

WITNESSES.  
Frederick A. Herring  
Consider H. Willett

INVENTOR.  
Sven J. Olsson  
By Gridley & Warner  
Attys ered, as shown, and the inner face of the shoulder $a'$ is beveled in a corresponding manner.
UNITED STATES PATENT OFFICE.

SVEN J. OLSSON, OF CHICAGO, ILLINOIS.

IMPROVEMENT IN WASTE-COCKS OR OUTLET-VALVES.

Specification forming part of Letters Patent No. 143,995, dated October 28, 1873; application filed July 17, 1873.

*To all whom it may concern:*

Be it known that I, SVEN J. OLSSON, of Chicago, in the county of Cook and State of Illinois, have invented a new, useful, and Improved Waste-Cock or Outlet-Valve, of which the following is a full, clear, and exact description, which will enable others skilled in the art to which my invention appertains to make and use the same, reference being had to the accompanying drawing forming a part of this specification, and in which—

Figure 1:
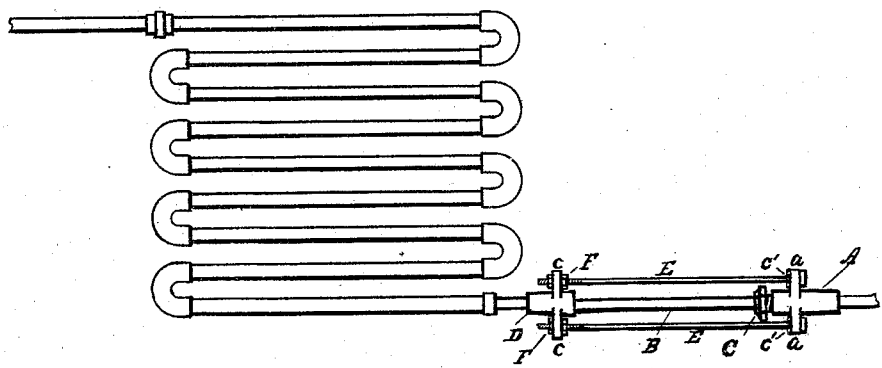
Figure 2:
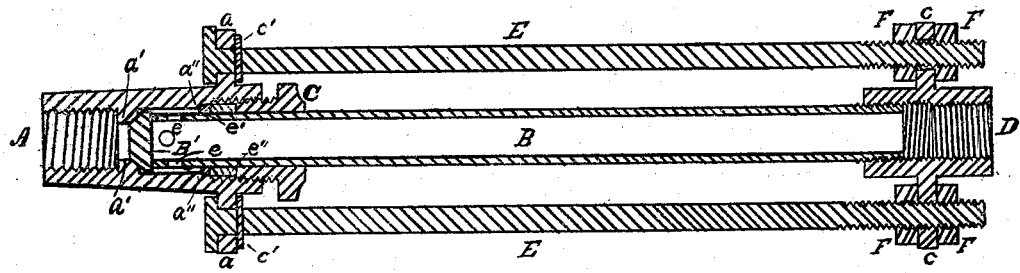

Figure 1 represents a side elevation of a steam-heating apparatus provided with my improved waste-cock or outlet-valve; and Fig. 2, a vertical central longitudinal section through the valve device.

Like letters of reference indicate like parts.

The object of my invention is to make a device whereby the water or condensed steam in the pipes of a steam-heating apparatus may be automatically dicharged without allowing the steam to escape, and which may also be used as a waste-cock or outlet-valve for various other purposes.

In the drawing, A represents a nozzle provided with the ears $a\ a$. The outer end of this nozzle is screw-threaded, as shown, so that it may be firmly attached to a waste-pipe made screw-threaded to receive it; but it may be attached thereto in any suitable manner. $a'$ and $a''$ are annular shoulders in the nozzle A. The inner end of the nozzle A is also screw-threaded, as shown, for the purpose hereinafter mentioned. B is a tube made, preferably, of copper, and B' is a plug or stopper arranged in one end of the tube B. The outer or exterior edge of the plug B' is beveled, as shown, and the inner face of the shoulder $a'$ is beveled in a corresponding manner. The tube B and plug B' are of such a diameter that they may be readily inserted into the inner end of the nozzle A, and be surrounded by an annular space. The plug B' is of such a size as to rest upon the shoulder $a'$ and firmly close the opening therein. $e\ e$ are openings or perforations in that end of the tube B in which the plug B' is inserted. $e'$ is a washer arranged on the tube B, and resting on the shoulder $a''$. $e''$ is a packing consisting, preferably, of a rubber ring arranged on the tube B. C is a nut, also arranged on the tube B, and provided with a screw-thread to engage the inner end of the nozzle A. By this means, the packing $e''$ may be compressed so as to make a tight joint between the nozzle A and the tube B; and the latter is also capable of being moved longitudinally in the nozzle. D is a nut or coupling run upon the tube B, and $c\ c$ are ears on the coupling. E E are bolts extending through the ears $a$ and $c$. $c'\ c'$ are pins extending through the bolts E E, so as to prevent the latter from moving longitudinally in the ears $a\ a$. F F are nuts run upon the bolts E E, and arranged upon each side of the ears $c\ c$.

In using my device, I attach it to the lowest part of the coil of the heating apparatus, as shown in Fig. 1. I then arrange the nuts F F so that the valve in the nozzle A will be open, thus allowing the steam to pass through the device until the pipe B is thereby heated. After the pipe B has been exposed for a short time to the influence of the steam, and thus expanded, I arrange the nuts F F so that the valve in the nozzle will be firmly closed. As soon as the steam in the heating apparatus begins to be condensed the condensed steam or water flows into the tube B, and, the temperature of the water being lower than that of the steam, the tube B is contracted and the valve is thus opened. When the valve is open the steam forces the water out through the nozzle A; and, when the steam again enters the tube B, the latter will be again expanded, and the valve will thus be closed again. This operation will be repeated as often as a sufficient quantity of water finds its way into the tube B.

In practice, I deem it preferable to make the tube B three or four feet long, so that it will be expanded sufficiently to close the valve before the steam reaches the openings $e$.

It will be perceived form the foregoing description that the device is automatic in its action, and that it may be used as a waste-cock for various purposes.

Having thus described my invention, what I claim as new, and desire to secure by Letters Patent, is—

A waste-cock consisting of the combination and arrangement of the nozzle A provided with the ears $a\ a$, and with the shoulders $a'$ and $a''$, and having its inner end screw-threaded, the coupling D provided with the ears $c\ c$, the tube B provided with the plug B′, and having the tubes or ports $e\ e$ therein, the packing $c''$, the nut C, the bolts E E, and the nuts F F, substantially as and for the purpose specified.

SVEN J. OLSSON.

Witnesses:
N. C. GRIDLEY,
F. F. WARNER.